United States Patent [19]

Huchital et al.

[11] 4,300,098

[45] Nov. 10, 1981

[54] MICROWAVE ELECTROMAGNETIC LOGGING WITH MUDCAKE CORRECTION

[75] Inventors: Gerald S. Huchital, Brookfield; Stanley Gianzero, Ridgefield, both of Conn.

[73] Assignee: Schlumberger Technology Corporation, New York, N.Y.

[21] Appl. No.: 42,385

[22] Filed: May 24, 1979

[51] Int. Cl.³ ............................................. G01V 3/30
[52] U.S. Cl. .................................................. 324/338
[58] Field of Search ................ 324/338, 339, 341, 334; 73/152

[56] References Cited

U.S. PATENT DOCUMENTS

| | | | |
|---|---|---|---|
| 1,919,917 | 7/1933 | Truman | 324/334 |
| 3,608,373 | 9/1971 | Youmans | 73/152 |
| 3,690,164 | 9/1972 | Gabillard et al. | 324/334 |
| 3,944,910 | 3/1976 | Rau | 324/338 |
| 4,012,689 | 3/1977 | Cox et al. | 324/341 |
| 4,092,583 | 5/1978 | Coates | 324/338 |
| 4,107,597 | 8/1978 | Meador et al. | 324/341 |
| 4,185,238 | 1/1980 | Huchital et al. | 324/338 |

FOREIGN PATENT DOCUMENTS

330245  4/1972  U.S.S.R. .............................. 324/341

*Primary Examiner*—Gerard R. Strecker
*Attorney, Agent, or Firm*—Henry Garrana; Martin Novack

[57] ABSTRACT

The disclosure is directed to a technique used for determining the mudcake-corrected water-filled porosity of formations surrounding a borehole, and which can also be used for determining the thickness of the mudcake formed on the borehole. Microwave electromagnetic energy is transmitted into the formations. Near and far receiving antennas are employed for receiving microwave electromagnetic energy from the formations. Means responsive to the outputs of the receiving antennas are provided for obtaining a travel-time-dependent differential measurement. Further means, responsive to the output of one of the antennas, are provided for obtaining a travel-time-dependent direct measurement. Finally, means are provided for determining the mudcake-corrected water-filled porosity of the formations from the differential and direct measurements. The mudcake thickness may also be determined from the differential and direct measurements. In the preferred embodiment of the invention, the means for obtaining the travel-time-dependent differential measurement is operative to measure the phase difference between the electromagnetic energy received at the near and far receivers, and the means for obtaining the travel-time-dependent direct measurement is operative to measure the phase difference between a reference derived from the transmitted electromagnetic energy and the electromagnetic energy received at the far receiver.

18 Claims, 6 Drawing Figures

MICROWAVE ELECTROMAGNETIC LOGGING WITH MUDCAKE CORRECTION

BACKGROUND OF THE INVENTION

Various techniques have been set forth for measuring the dielectric constant or electric permittivity of subsurface formations. Prior investigators have recognized that the relative dielectric constant of the different materials of earth formations vary widely (e.g. 2.2 for oil, 7.5 for limestone, and 80 for water) and that the measurement of dielectric properties therefore holds promise of being a useful means of formation evaluation. Since hydrocarbons and fresh water can have similar resistivity, the contrast between the dielectric constant of hydrocarbons and water is especially meaningful in situations where low salinity is encountered.

There has been recently developed a logging device which investigates earth formations surrounding a borehole by radiating microwave electromagnetic energy into the formations and then taking measurements which relate to the propagation of the energy in the formations. A form of this device, currently designated as an "electromagnetic propagation tool" (or "EPT") is disclosed in the U.S. Pat. No. 3,944,910. In operation of the EPT logging device, the relative phase of energy received at a spaced receiver pair is measured and used to obtain indications of the formation dielectric constant, typically in the so-called invaded zone of the formations which are nearest the borehole. (At a fixed frequency of operation, relative phase and travel time per unit distance are proportionally related, and travel time will be referred to in place of phase in this background discussion.) The wave attenuation may also be measured at the receivers and used to implement corrections to the EPT travel time measurements since the lossiness of the propagation medium can affect travel time therethrough.

Since the dielectric constant of water is much higher than that of hydrocarbons or formation matrix material, the travel time will be largely dependent upon the fraction of water in the formations; i.e., the water-filled porosity of the formations, designated $\phi_w$. In the above-referenced U.S. Pat. No. 3,944,910, and in U.S. Pat. No. 4,092,583, there are disclosed techniques for obtaining $\phi_w$ from travel time (and attenuation, where applicable) measurements taken with an EPT logging device.

While the EPT has proved to be quite effective in obtaining measurements of properties of subsurface formations surrounding a borehole, viz. in the invaded zone thereof, it has been found that presence of a substantial mudcake can sometimes give rise to inaccuracies. The EPT has a relatively short spacing between transmitter and receivers and an attendant shallow depth of investigation. It therefore stands to reason that such a shallow investigation measurement device will necessarily be "looking" at mudcake to some extent. Techniques for determination of mudcake thickness and/or for correction of the effects of mudcake thickness have been set forth in the prior art in the context of certain logging devices, such as acoustical logging devices. For example, in the U.S. Pat. No. 3,608,373, there is disclosed an acoustic logging device which utilizes the difference between direct and differential pulsed acoustic travel times to obtain mudcake thickness. The use of a difference follows directly from a difference in travel paths of the acoustic wave; i.e., one path (the differential) having travel time through the mudcake cancel out, whereas the other path (direct) includes travel time through the mudcake. This simplified plane-wave type of model is not sufficient, however, when considering the effects of mudcake on an EPT device wherein continuous wave electromagnetic energy, rather than acoustic energy, is measured at the receivers in the relatively "near field" of the wave energy. The spacings of the EPT device necessitate a "near field" phenomenon analysis which takes into account electrical properties of both the mudcake and the formations that will affect the field measured at the receivers. In particular, both the conductivity and the dielectric constant of the mudcake and the formations, as well as the mudcake thickness, will affect the field detected at the receivers of the logging device. Accordingly, simple relationships between travel times will not yield a meaningful mudcake correction for the EPT.

It is one of the objects of the present invention to provide an apparatus and method for determining mudcake-corrected EPT-determined measurements of formations surrounding a borehole.

SUMMARY OF THE INVENTION

The present invention is directed to an apparatus and method for determining the mudcake-corrected water-filled porosity of formations surrounding a borehole, and can also be used to determine the thickness of the mudcake formed on said borehole. In accordance with an embodiment of the invented apparatus, there is provided a source of microwave electromagnetic energy. A transmitting antenna is used for transmitting the microwave electromagnetic energy into the formations. Near and far receiving antennas are employed for receiving microwave electromagnetic energy from the formations. Means responsive to the outputs of the receiving antennas are provided for obtaining a travel-time-dependent differential measurement. Further means, responsive to the output of one of the antennas, are provided for obtaining a travel-time-dependent direct measurement. Finally, means are provided for determining the mudcake-corrected water-filled porosity of the formations from the differential and direct measurements. The mudcake thickness may also be determined from the differential and direct measurements.

In the preferred embodiment of the invention, the means for obtaining a travel-time-dependent direct measurement is responsive to the output of the far receiver, and the means for obtaining both travel-time-dependent measurements are each operative to measure the phase velocity of the electromagnetic energy. More particularly, the means for obtaining the travel-time-dependent differential measurement is operative to measure the phase difference between the electromagnetic energy received at the near and far receivers, and the means for obtaining the travel-time-dependent direct measurement is operative to measure the phase difference between a reference derived from the transmitted electromagnetic energy and the electromagnetic energy received at the far receiver.

Further features and advantages of the invention will become more readily apparent from the following detailed description when taken in conjunction with the accompanying drawings.

DESCRIPTION OF THE PREFERRED EMBODIMENT

Figure 1:
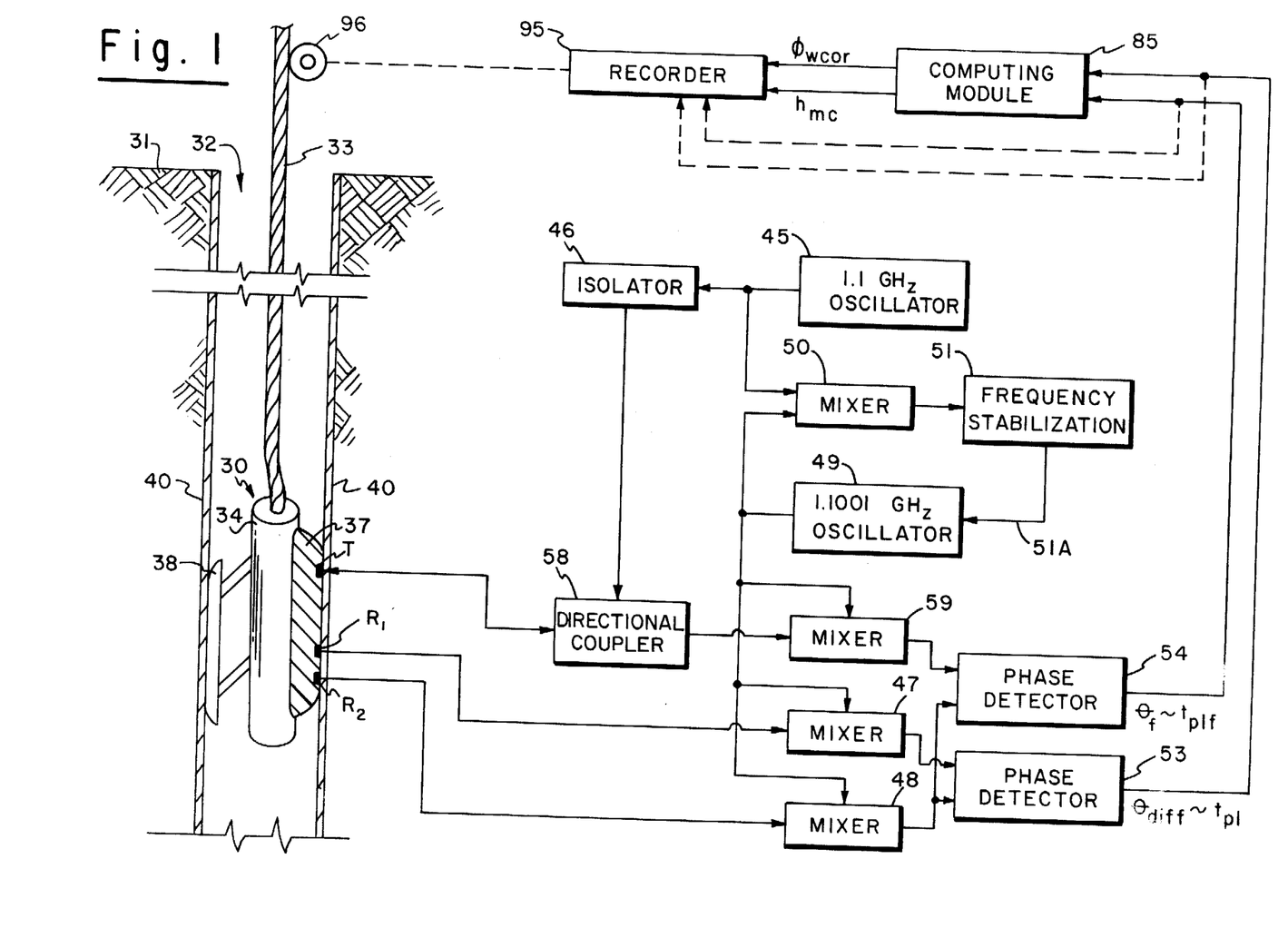
FIG. 1 is a block diagram of an apparatus in accordance with an embodiment of the invention.

Referring to FIG. 1, there is shown a representative embodiment of an apparatus 30 in accordance with the present invention, and which can be used for practicing the method of the invention, for investigating subsurface formations 31 traversed by a borehole 32. The borehole 32 is typically filled with a drilling fluid or mud which contains finely divided solids in suspension. Generally, the fluid pressure in the formations traversed by the borehole is less than the hydrostatic pressure of the column of mud in the borehole, so that the mud and mud filtrate flow somewhat into the formations. As is well known, the formations tend to screen the small particles suspended in the mud so that a mudcake is formed on the walls of the borehole. The thickness of the mudcake varies with formation parameters such as permeability, but at least a very thin mudcake is usually present on the borehole wall. In FIG. 1, the mudcake is indicated by reference numeral 40.

The investigating apparatus or logging device 30 is suspended in the borehole 32 on an armored cable 33, the length of which substantially determines the relative depth of the device 30. The cable length is controlled by suitable means at the surface such as a drum and winch mechanism (not shown). The logging device 30 includes an elongated cylindrical support member 34, the interior portion of which has a fluid-tight housing containing the bulk of the downhole electronics. Mounted on one side of support member 34 is a pad 37 which contains, inter alia, transmitting antenna T and vertically spaced receiving antennas $R_1$ and $R_2$. On the other side of support member 34 is mounted a backup arm 38 which may be hydraulically controlled to maintain the pad 37 in contact with the borehole wall. The backup arm 38 can also be used to provide a caliper reading. Electronic signals indicative of the information obtained by the logging device are transmitted through the cable 32 to a computing module 85 and a recorder 95, located at the surface of the earth. The particular means shown in FIG. 1 for maintaining the antennas in engagement with the borehole wall is illustrative, and it will be appreciated that other known suitable means for accomplishing this objective can be utilized.

The downhole electronics contained within member 34 are shown, for convenience of illustration, at the side of the borehole. Solid-state oscillator 45 provides output energy in the microwave region of the spectrum. The microwave region is defined herein as including the range of frequencies between about 300 MHz. and 300 GHz. In the present embodiment, the oscillator operates at a frequency of 1.1 GHz; i.e., $1.1 \times 10^9$ cycles per second. The output of oscillator 45 is coupled through an isolator 46 and a directional coupler 58 to the transmitting antenna T. Microwave energy is transmitted into the surrounding formations establishing an energy field. The energy received at antennas $R_1$ and $R_2$ is respectively coupled to input terminals of the mixers 47 and 48. The signals which arrive from R1 and R2 are out of phase with each other by an amount which depends on the properties on the media surrounding these receivers. Secondary input terminals of the mixers 47 and 48 are supplied with microwave energy at a frequency that is separated from the transmitter frequency by some relatively low frequency which is typically in the radio frequency range. In the illustrated embodiment, a solidstate oscillator 49 supplies microwave energy to mixers 47 and 48 at a frequency of 1.1001 GHz, or 100 KHz above the transmitter frequency. The outputs of the mixers 47 and 48 therefore contain the difference frequency of 100 KHz. In accordance with well known principals, the mixer outputs maintain the phase relationship of the signals from $R_1$ and $R_2$, but the task of phase detection is facilitated at the lower frequency of the mixed signals. To insure that the difference frequency between the outputs of the oscillators 45 and 49 remains at 100 KHz, the oscillator outputs are sampled and fed to a mixer 50. The output of the mixer is received by a frequency stabilization circuit 51 which detects drifts from the 100 KHz standard and generates a correction signal 51A which controls oscillator 49 in the manner of a conventional phase-locked loop.

The outputs of mixers 47 and 48 are applied to a phase detector circuit 53, whose output is a signal level which is proportional to the phase difference between the signals received at $R_1$ and $R_2$, this phase difference being designated as $\theta_{diff}$. Phase detection may be, for example, of the type disclosed in the U.S. Pat. No. 3,849,721, wherein zero-crossings of the mixer outputs are detected and then utilized to turn a flip-flop on and off to obtain pulses whose duration represent the desired phase difference. The pulses can be integrated to obtain a signal level representative of $\theta_{diff}$. At a fixed frequency of operation, travel time is proportional to phase, and the travel time output of detector 53 is designated as $t_{pl}$.

The directional coupler 58 receives a portion of the energy from transmitter T reflected directly back from the formations, and this energy is coupled to a mixer 59 which receives as its other input the 1.1001 GHz signal from oscillator 49. The output of mixer 59 therefore has a reference phase related to the phase to the transmitted microwave energy, although it will be understood that there are alternative ways in which a reference phase can be established. The output of mixer 59 and the output of mixer 48 are coupled to a phase detector 54 whose output, designated $\theta_f$, is the phase difference between a reference phase derived from the transmitter and the phase of the signal received at the far receiver, $R_2$. This phase is a function of the properties of the media surrounding the region between the transmitter and the far receiver of the logging device 30. The travel time proportional to $\theta_f$ is designated as $t_{plf}$.

The outputs of phase detector circuits, 53 and 54 are transmitted to the surface of the earth through the armored cable 33. At the surface of the earth, these signals are applied to a computing module 85 which is operative to determine a mudcake-corrected water-filled porosity, $\phi_{wcor}$, and to determine mudcake thickness, $h_{mc}$, in accordance with principles of the invention. The signals representative of these determined quantities are recorded versus borehole depth by a recorder 95 that is conventionally driven by a rotating wheel 96. The wheel 96 is coupled to the cable 33 and rotates in synchronism with the motion of the cable so as to move as a function of borehole depth. The signals representative of $t_{pl}$ and $t_{plf}$ can also be recorded as a function of borehole depth, as indicated by the dashed lines coupling these signals to the recorder 95.

Figure 2:
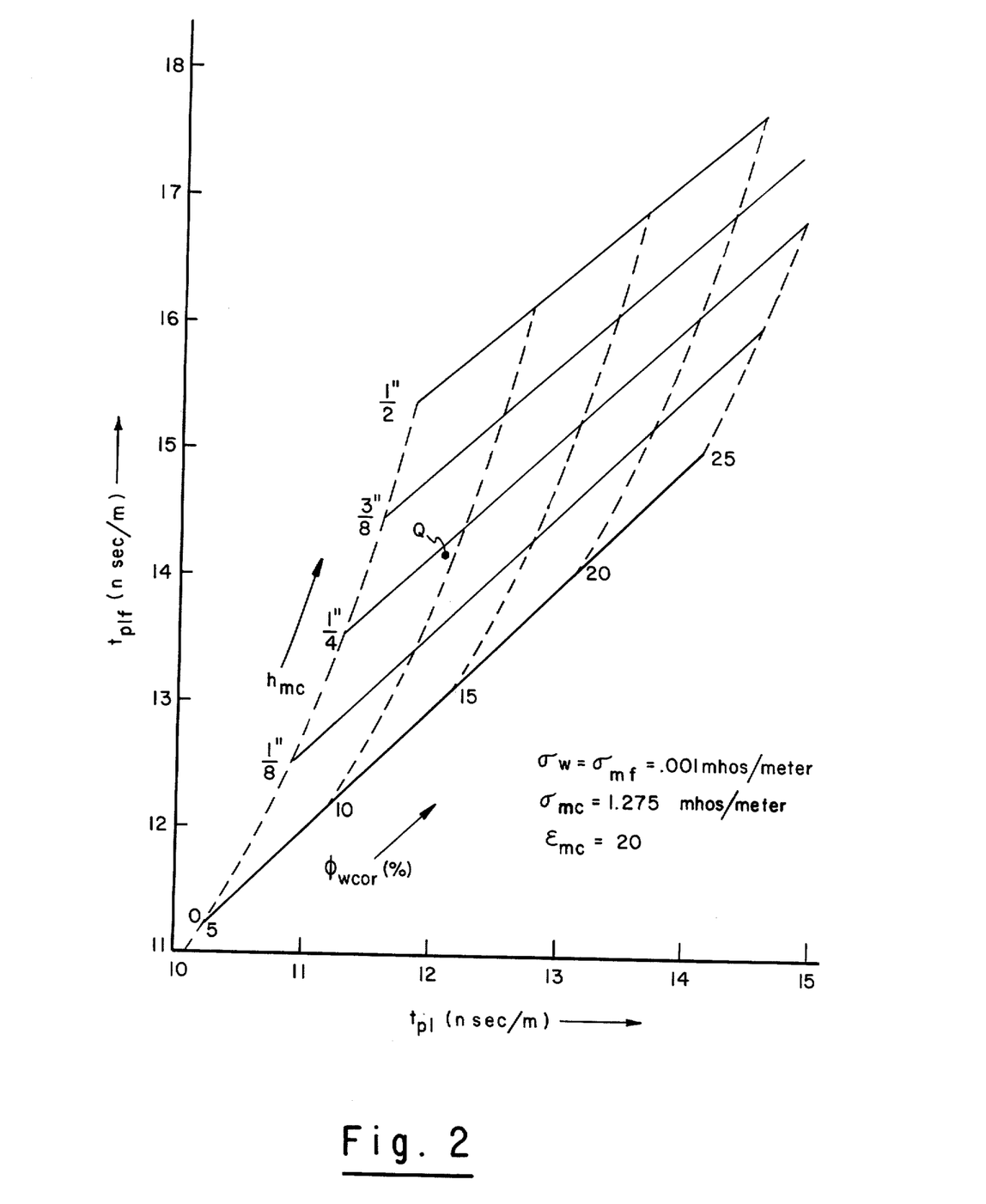
FIG. 2 is a cross-plot of differential versus direct travel times as a function of porosity and mudcake thickness.

Referring to FIG. 2, there is shown cross-plot graph of $t_{plf}$ versus $t_{pl}$ for various values of $\phi_{wcor}$ and $h_{mc}$. When values of $t_{pl}$ and $t_{plf}$ are received uphole from phase detectors 53 and 54, the computing module 85 is operative to determine $\phi_{wcor}$ and/or $h_{mc}$ in accordance with the relationships represented in this graph (or, for particular conditions, relationships representable by other graphs, as will be described), such as by employing a table look-up routine or curve matching. For example, measurements of a differential travel-time of about 12 nanoseconds per meter and a direct travel time of about 14 nanoseconds per meter would indicate a corrected water-filled porosity, $\phi_{wcor}$, of about 10 percent and a mudcake thickness, $h_{mc}$, of about ¼ inch (point Q of FIG. 2). It is readily seen that for a given value of $t_{pl}$, increasing values of $t_{plf}$ would indicate a thicker mudcake. Conversely, for increasing values of $t_{plf}$ (again, for a given fixed value of $t_{pl}$), the corrected value $\phi_{wcor}$ will be smaller than would have been indicated by $t_{pl}$ alone. This stands to reason since the $t_{pl}$ measurement actually "looks" to some degree at the mudcake which has a high water content and whose influence (absent correction) would result in a higher-than-actual indication of water-filled porosity.

Figure 3:
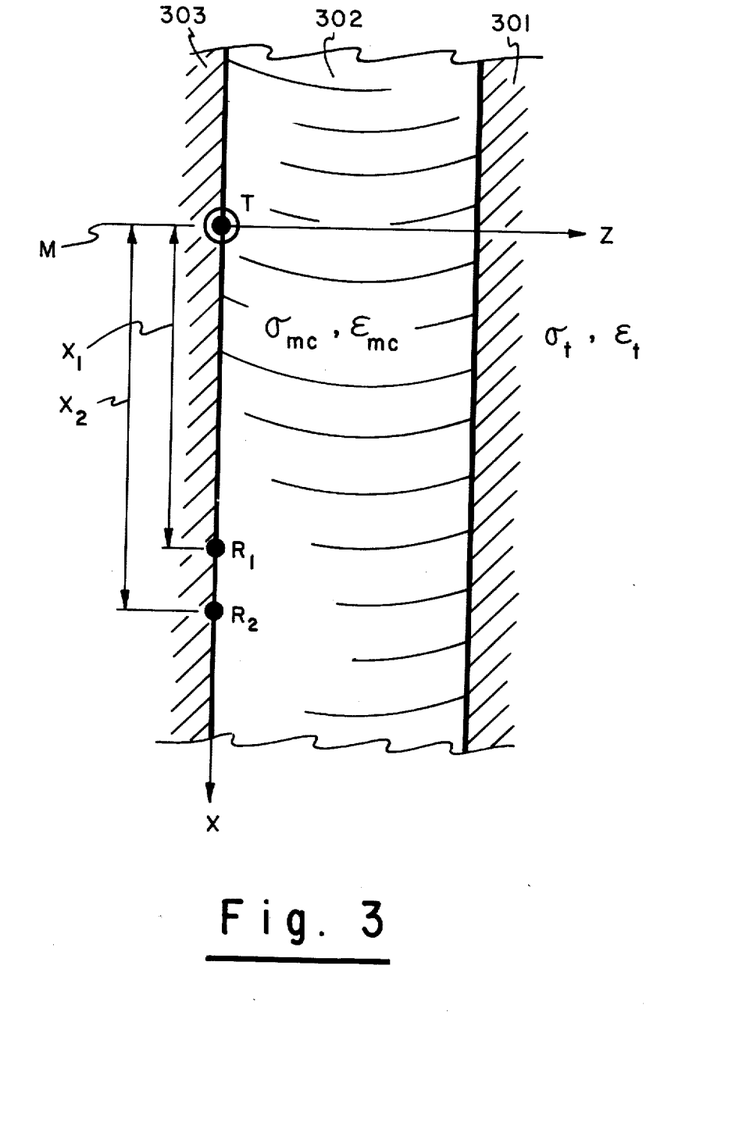
FIG. 3 illustrates the model utilized in obtaining the cross-plot of FIG. 2.

The manner in which the graph of FIG. 2 can be obtained (and, preferably, the information thereof entered in a look-up table of computing module 85 of FIG. 1) will now be described. Consider the model of FIG. 3 which includes a formation 301, a mudcake 302 and a metal region 303 representative of the pad 37 of the logging device 30 (FIG. 1) in which the antennas are housed. The mudcake has a thickness designated $h_{mc}$ and conductivity and dielectric constant designated $\sigma_{mc}$ and $\epsilon_{mc}$, respectively. The formation has conductivity and dielectric constant designated $\sigma_t$ and $\epsilon_t$, respectively. When logging with an EPT type of logging device, the antenna spacings are generally such that the depth of investigation is shallow and the measurements indicate properties of the formation invaded zone. For generality, however, the zone 301 has subscripts t to indicate formation parameters. The formation has a water-filled porosity (i.e., the pore fraction thereof containing water) designated $\phi_w$, and the conductivity of the water therein is designated $\sigma_w$. In the model of FIG. 3, the magnetic field generated at the transmitting antenna T is approximated by a magnetic line source perpendicular to the plane of the paper.

Before setting forth the specifics of how the curves of FIG. 2 are obtained from the model of FIG. 3, the general approach will be briefly explained. The magnetic field at a distance x from the source can be expressed as a function $$H(x) = f(x, h_{mc}, \sigma_{mc}, \epsilon_{mc}, \sigma_t, \epsilon_t) = H_x e^{j\theta_x} \tag{1}$$

where the quantities in the parenthesis are those of the FIG. 3 model and $H_x$ and $\theta_x$ are respectively the magnitude and phase of the field at x. The mudcake parameters $\sigma_{mc}$ and $\epsilon_{mc}$ are assumed (for example $\sigma_{mc} = 1.275$ mhos per meter, $\sigma_w = 0.001$ mhos per meter, and $\epsilon_{mc} = 20$ for the FIG. 3 model and FIG. 2 curves). To obtain a single point of the FIG. 2 curves, values of $h_{mc}$ and $\phi_w$ are selected. The selected value of $\phi_w$ is used to obtain $\sigma_t$ and $\epsilon_t$ using the assumed $\sigma_w$ value, as will be described. Then, the relationship (1) can be employed for the cases $x = x_1$ (the distance to the near receiver $R_1$) and $x = x_2$ (the distance to the far receiver $R_2$) to obtain phase angles $\theta_{diff}$ and $\theta_f$, i.e., respectively, the relative phase difference as between $x_2$ and $x_1$ and the relative phase at $x_2$ (with respect to a phase reference near the transmitter). The differential travel time, $t_{pl}$, is proportional to $\theta_{diff}$ and the direct travel time $t_{plf}$ is proportional to $\theta_f$. Therefore, the location of the particular point ($h_{mc}$, $\phi_w$) is established on the $t_{pl}$ vs. $t_{plf}$ plot. Further points on the plot (or, stored in the look-up table) are then determined in the same way. The values of $\phi_w$ in the FIG. 2 plot take into account the effects of the mudcake, and are thus designated $\phi_{wcor}$.

Turning now to the actual expression for the magnetic field at x, we have $$H(x) = \frac{jMk_{mc}^2}{2\pi} \int_{-\infty}^{\infty} \frac{d\xi e^{j\xi x}}{\gamma_{mc}} \cdot \frac{1 + \Gamma e^{2j\gamma_{mc}h_{mc}}}{1 + \Gamma e^{2j\gamma_{mc}h_{mc}}} \tag{2}$$

where M is magnetic moment per unit length of the source, and the "reflection coefficient", $\Gamma$, is $$\Gamma = \frac{k_t^2 \gamma_{mc} - k_{mc}^2 \gamma_t}{k_t^2 \gamma_{mc} + k_{mc}^2 \gamma_t} \tag{3}$$

The longitudinal propagation constants, $\gamma$, are $$\gamma_{mc} = \sqrt{\xi^2 - k_{mc}^2} \tag{4}$$

$$\gamma_t = \sqrt{\xi^2 - k_t^2} \tag{5}$$

where $\xi$ is the integration variable and the propagation constants, k, are given by $$k_{mc} = k_o \sqrt{\epsilon_{mc} + j\frac{\sigma_{mc}}{\omega \epsilon_o}} \tag{6}$$

$$k_t = k_o \sqrt{\epsilon_t + j\frac{\sigma_t}{\omega \epsilon_o}} \tag{7}$$

and:

$k_o$ is the free space number,
$\epsilon_o$ is the free space dielectric constant,
$\omega$ is the angular frequency of the source
($= 2\pi \times 1.1 \times 10^9$ in this case).

H(x) is a complex quantity which can be set forth at the points $R_1$ and $R_2$, i.e., at distances $x_1$ and $x_2$, as $$H(x_n) = H_{x1} e^{j\theta_1} \tag{8}$$

$$H(x_f) = H_{x2} e^{j\theta_2} \tag{9}$$

where $H_{x1}$ and $H_{x2}$ are magnitudes and $\theta_1$ and $\theta_2$ are phases. Taking the natural log of the ratio of (8) and (9) yields $$RE \ln \frac{H(x_1)}{H(x_2)} + j\, IM \ln \frac{H(x_1)}{H(x_2)} = \ln \frac{H(x_1)}{H(x_2)} + j(\theta_1 - \theta_2) \tag{10}$$

Equating imaginary parts then gives $$\theta_{diff} = \theta_2 - \theta_1 = -IM \ln \frac{H(x_1)}{H(x_2)} \quad (11)$$

To obtain $\theta_f$ (i.e., the relative phase at $x_2$ with respect to a fixed phase reference at or near the transmitter) substitute $x_{ref}$, a short reference distance, for $x_n$ to obtain $$\theta_f = \theta_2 - \theta_{ref} = -IM \ln \frac{H(x_{ref})}{H(x_1)} \quad (12)$$

Now, relationship, (2) can be substituted into (11) and (12) to solve for $\theta_{diff}$ and $\theta_f$. In equation (7), $\sigma_t$ and $\epsilon_t$ are respectively obtained, using the assumed $\sigma_w$ and the selected $\phi_w$, from the Archie relationship for the EPT and the time-averaged dielectric permittivity relationship (see e.g. U.S. Pat. Nos. 3,944,910, 4,092,583, and copending U.S. Application Ser. No. 806,983, assigned to the same assignee as the present application), with a matrix $\epsilon_m$ of 7.5 (e.g. limestone). As above-stated, $\theta_{diff}$ and $\theta_f$ are respectively proportional to $t_{pl}$ and $t_{plf}$. For the EPT frequency and spacings, we have:

$$t_{pl} = 0.0631 \cdot (\theta_{diff}) \text{ nsec/meter} \quad (13)$$

$$t_{plf} = 0.0631 \cdot (\theta_f) \text{ nsec/meter} \quad (14)$$

Having obtained $t_{pl}$ and $t_{plf}$ for selected values of $h_{mc}$ and $\phi_w$, $h_{mc}$ is then successively incremented and the same procedure is followed. The value of $\phi_w$ is then incremented successively (each time going through the full range of $h_{mc}$) to successively obtain the complete cross-plot information.

Various techniques, well known in the art, can be employed to obtain and record $\phi_{wcor}$ and $h_{mc}$ consistent with the relationships set forth, either at the well logging site or at a remote location. It is preferred that a general purpose digital computer be loaded with a table of values of $\phi_{wcor}$ and $h_{mc}$ corresponding to particular values of $t_{pl}$ and $t_{plf}$. This can be done in the same manner as that just described for obtaining the curves of FIG. 2. Later, once the values have been stored and during operation, as values of $t_{pl}$ and $t_{plf}$ are obtained from phase detectors 53 and 54, the computer automatically looks up corresponding values of $\phi_{wcor}$ and $h_{mc}$ in the stored table, and these values are recorded on recorder 95.

An alternative to the table look-up technique would be a curve matching technique using, for example, a least-squares process. Another alternative is to obtain solutions to equations (11) and (12) iteratively by selecting "guess" values and then incrementing them successively to converge to solutions. A still further possible approach is to provide a special purpose analogue or digital computer which provides output functions that simulate the family of curves of FIG. 2. It will also be recognized that by using the described logging device in a test pit borehole, appropriate stored values could be obtained empirically.

Figure 4:
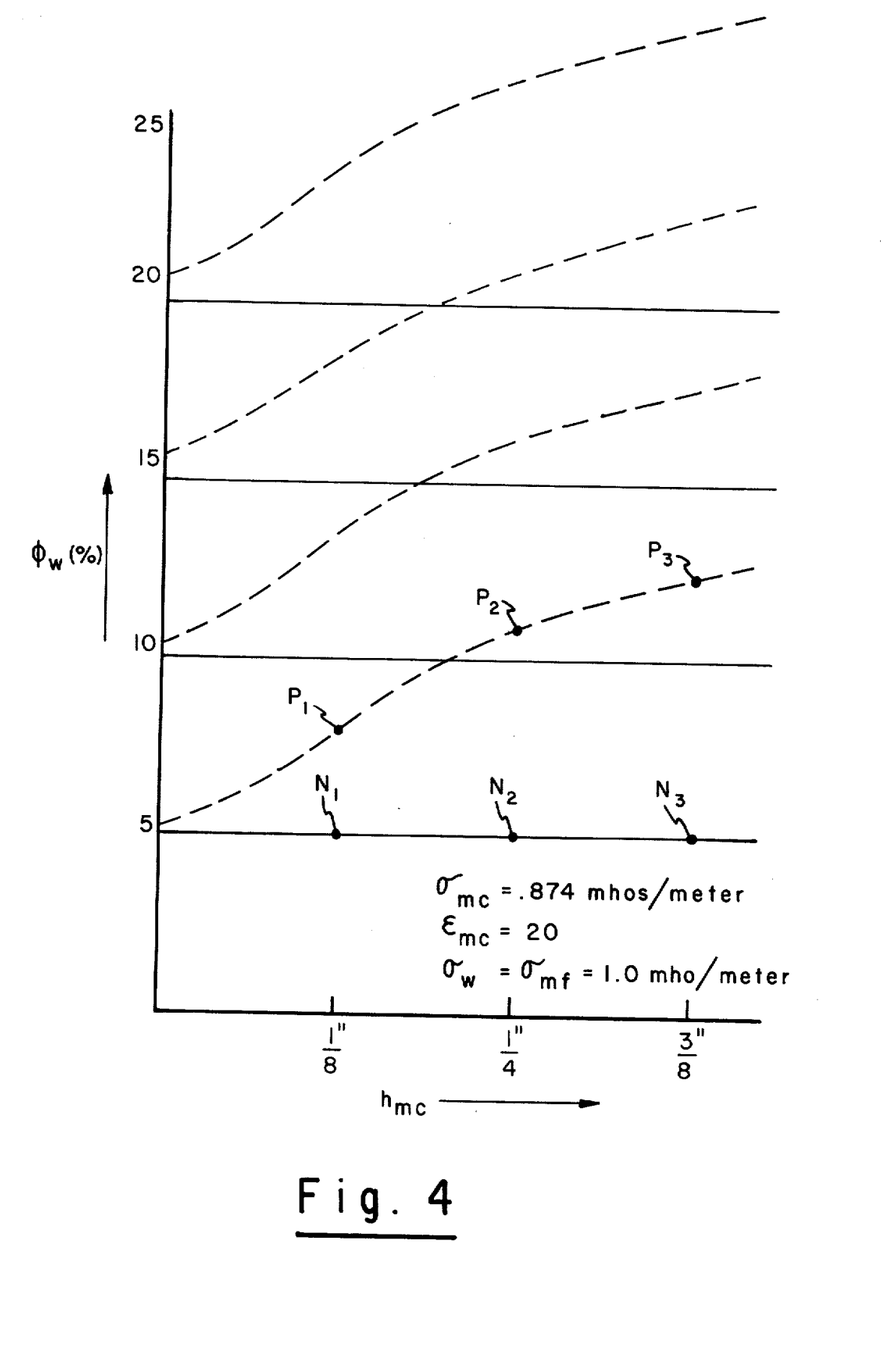
FIG. 4 is a plot of porosity versus mudcake thickness, with and without correction in accordance with the principles of the invention.

FIG. 4 is a plot of porosity vs. mudcake thickness, with the solid line curves representing the mudcake corrected water-filled porosity, $\phi_{wcor}$, corrected using the curves of FIG. 2, and the dashed line curves representing the uncorrected (apparent) water-filled porosity, $\phi_{wa}$ that would be expected to be obtained without the corrections hereof. The curves of FIG. 4 assume $\sigma_{mc} = 0.87$ mhos per meter, $\epsilon_{mc} = 20$ and $\sigma_w = \sigma_{mf} = 1$ mho per meter; i.e., conditions which do not necessarily correspond to the conditions used when formulating the curves of FIG. 2. (Indeed, an unlikely degree of mismatch between the conditions assumed when formulating correction factors and actual conditions helps to demonstrate that precise knowledge of actual conditions is not required for the useful corrections hereof.) It is seen that the solid line curves yield a substantially consistent indication of water-filled porosity over the range of mudcake thicknesses. In contrast, the dashed line curves illustrate the effect mudcake can have (if not corrected for) on determinations of apparent water-filled porosity. The dashed line curves of FIG. 4 are obtained as follows An initial "true" (actual) value of porosity is selected (e.g. 5% for the bottom curve of FIG. 4) along with an initial selected value of $h_{mc}$ (e.g. $h_{mc} = \frac{1}{8}''$ for the leftmost point, excepting $h_{mc} = 0$, of the bottom curve of FIG. 4). These values and the assumed conditions (noted above and listed on FIG. 4) are used to obtain the differential phase $\theta_{diff}$ consistent with the relationship (11) set forth above. From $\theta_{diff}$ (which is proportional to the differential travel time in accordance with (13)) a water-filled porosity $\phi_{wa}$ ("apparent" or uncorrected) is obtained from $$\phi_{wa} = \frac{t_{pl} - t_{pm}}{t_{pwl} - t_{pm}} \quad (15)$$

where $t_{pwl}$ is the travel time through water having a lossiness consistent with $\sigma_w$ and $t_{pm}$ is the travel time through the formation matrix. The resultant value of $\phi_{wa}$ is then plotted as the point $P_1$ of FIG. 4. The same procedure is then successively used with $h_{mc} = \frac{1}{4}''$ and $h_{mc} \times \frac{3}{8}''$ obtain the points $P_2$ and $P_3$ of FIG. 4. The next value of true porosity (10% in FIG. 4) is then used in conjunction with successive mudcake thicknesses to obtain the next higher dashed line curve, and so on.

To obtain the solid line curves of FIG. 4, $\phi_w$ (true) and $h_{mc}$ are again selected and $\theta_{diff}$ is computed, as before. In this case, however, $\theta_f$ is also computed in accordance with relationship (12). The differential travel time, $t_{pl}$, and the direct travel time to the far receiver, $t_{plf}$ are then obtained from $\theta_{diff}$ and $\theta_f$, respectively (relationships (13) and (14)), and the curves of FIG. 2 (or the look-up table of computing module 85) are then entered to read a corrected $\phi_{wcor}$ which is plotted in FIG. 4 (e.g., point $N_1$). The next points $N_2$ and $N_3$ are obtained by incrementing $h_{mc}$ to $\frac{1}{4}''$ and $\frac{3}{8}''$, and repeating the procedure. The selected value of $\phi_w$ (true) can then be successively incremented to obtain the other solid line curves of FIG. 4. It can be noted that the minor deviations of the solid line curves from the actual $\phi_w$ at $h_{mc} = 0$ are due to the difference in the assumed $\sigma$ and $\epsilon$ conditions as between FIGS. 2 and 4. The graph of FIG. 2 can be utilized with reasonable accuracy for other mudcakes and formation water resistivities.

Figure 5:
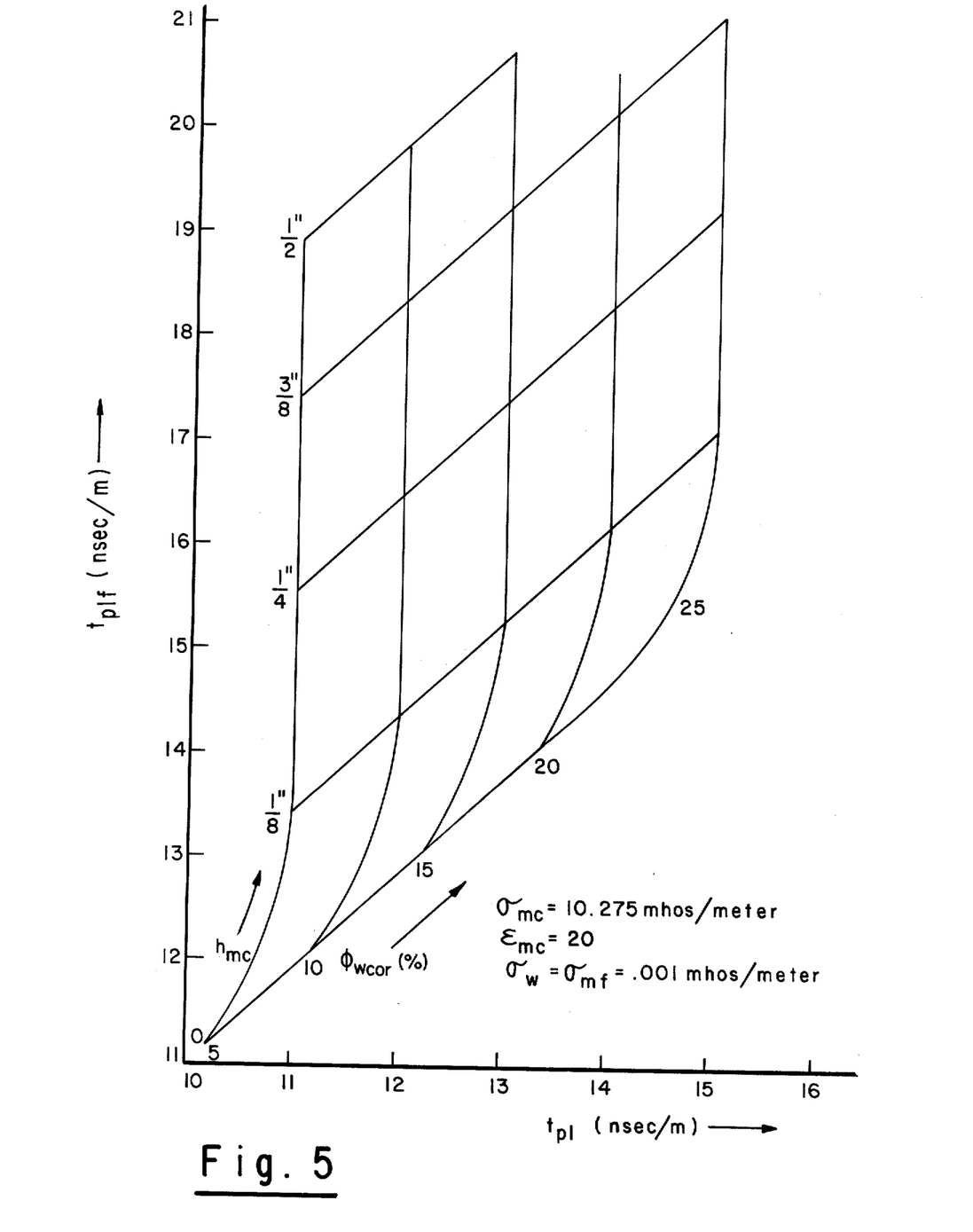
FIG. 5 is another cross-plot of differential versus direct travel times as a function of porosity and mudcake thickness.
Figure 6:
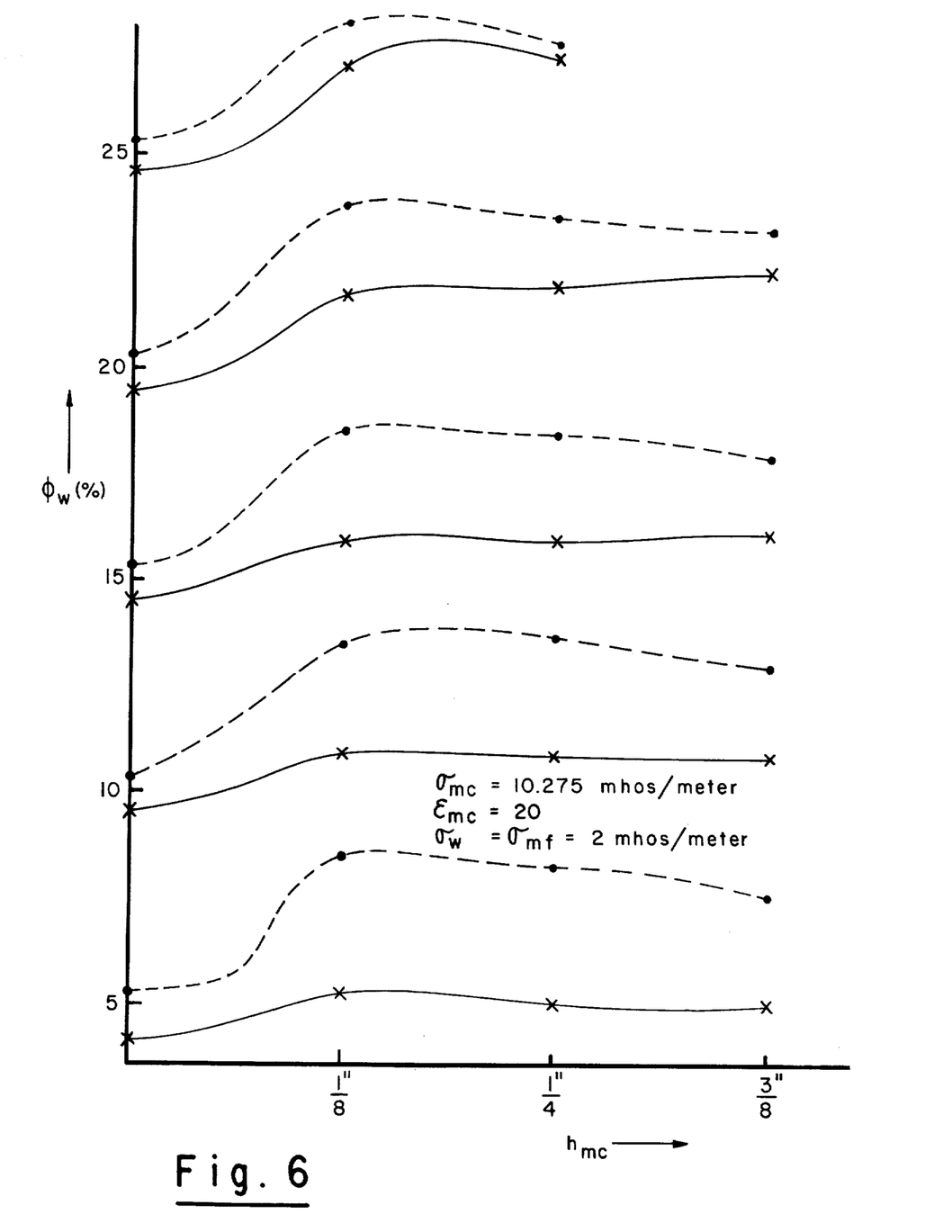
FIG. 6 is a further plot of porosity versus mudcake thickness, with and without correction in accordance with the principles of the invention.

For highly lossy mudcakes, it is preferred that a different cross-plot be utilized for porosity correction and/or mudcake thickness determination (again, the information contained in the cross-plot being entered in the table look-up of computing module 85). FIG. 5 illustrates the cross-plot obtained for the conditions $\sigma_{mc} = 10.275$ mhos per meter, $\epsilon_{mc} = 20$, and formation water resistivity, $R_w = R_{mf} = 1000$ ohm-meter. In order to know which cross-plot information should be utilized, it is desirable to have an approximate knowledge of the mudcake conductivity, this parameter generally being measurable uphole. FIG. 6 is a plot, like that of FIG. 4, of porosity versus mudcake thickness, but where the solid line curves representing the mudcake corrected water-filled porosity, $\phi_{wcor}$, corrected using the curves of FIG. 5, and the dashed line curves again representing the uncorrected water-filled porosity, $\phi_{wa}$, that would be expected to be obtained without the corrections hereof. It is seen that a higher conductivity mudcake requires less correction than in the previous case. This stands to reason since a higher conductivity mudcake will result in a stronger field in the lower loss formation media.

Although mudcake conductivity can be measured uphole, this is generally not true for the dielectric constant of the mudcake. However, mudcake dielectric constant is believed to generally be in the range of about 20–25. While it is advantageous to have as accurate of value for mudcake dielectric constant as possible in obtaining the illustrated cross-plots, relatively accurate determinations of mudcake-corrected water-filled porosity and/or mudcake thickness can be made within the expected range of inaccuracy of assumed mudcake dielectric constant.

The invention has been described with reference to a particular embodiment, but variations within the spirit and scope of the invention will occur to those skilled in the art. For example, the use of borehole compensation and temperature correction techniques, as is well known, can be readily employed, but is omitted from the present description for ease of explanation.

We claim:

1. Apparatus for determining the mudcake-corrected water-filled porosity of formations surrounding a borehole, comprising:
    a source of microwave electromagnetic energy;
    a logging device suspendable in the borehole;
    a transmitting antenna mounted on said device for transmitting said microwave electromagnetic energy into said formations;
    near and far spaced receiving antennas mounted on said device for receiving microwave electromagnetic energy from said formations;
    means responsive to the outputs of said receiving antennas for obtaining a differential measurement of travel time of said energy;
    means responsive to the output of one of said receiving antennas for obtaining a direct measurement of travel time of said energy; and
    means for determining the mudcake-corrected water-filled porosity of said formations from said differential and said direct measurements.

2. Apparatus as defined by claim 1, wherein said means for obtaining said direct measurement is responsive to the output of said far receiver.

3. Apparatus as defined by claim 2, wherein said means for obtaining said measurements are operative to measure the phase velocity of said electromagnetic energy.

4. Apparatus as defined by claim 1, wherein said means for obtaining said differential measurement is operative to measure the phase difference between the electromagnetic energy received at said near and far receivers, and said means for obtaining said direct measurement is operative to measure the phase difference between a reference derived from the transmitted electromagnetic energy and the electromagnetic energy received at said far receiver.

5. Apparatus as defined by claim 3, wherein said means for determining said mudcake-corrected water-filled porosity of said formations is also responsive to known electrical properties of the borehole mud.

6. Apparatus as defined by claim 4, wherein said means for determining said mudcake-corrected water-filled porosity of said formations is also responsive to known electrical properties of the borehole mud.

7. Apparatus for determining the mudcake thickness of formations surrounding a borehole, comprising:
    a source of microwave electromagnetic energy;
    a logging device suspendable in the borehole;
    a transmitting antenna mounted on said device for transmitting said microwave electromagnetic energy into said formations;
    near and far spaced receiving antennas mounted on said device for receiving microwave electromagnetic energy from said formations;
    means responsive to the outputs of said receiving antennas for obtaining a differential measurement of travel time of said energy;
    means responsive to the output of one of said receiving antennas for obtaining a direct measurement of travel time of said energy; and
    means for determining the mudcake thickness of said formations from said differential and said direct measurements.

8. Apparatus as defined by claim 7, wherein said means for obtaining said direct measurement is responsive to the output of said far receiver.

9. Apparatus as defined by claim 8, wherein said means for obtaining said measurements are operative to measure the phase velocity of said electromagnetic energy.

10. Apparatus as defined by claim 7, wherein said means for obtaining said differential measurement is operative to measure the phase difference between the electromagnetic energy received at said near and far receivers, and said means for obtaining said direct measurement is operative to measure the phase difference between a reference derived from the transmitted electromagnetic energy and the electromagnetic energy received at said far receiver.

11. Apparatus as defined by claim 9, wherein said means for determining said mudcake thickness of said formations is also responsive to known electrical properties of the borehole mud.

12. Apparatus as defined by claim 10, wherein said means for determining said mudcake thickness of said formations is also responsive to known electrical properties of the borehole mud.

13. A method for determining the mudcake-corrected water-filled porosity and/or the mudcake thickness of formations surrounding a borehole, comprising the steps of:
    transmitting microwave electromagnetic energy into said formations from a transmitter location within said borehole;
    receiving microwave electromagnetic energy from said formations at near and far spaced receiving antennas within said borehole;
    obtaining a differential measurement of travel time of said energy from the outputs of said receiving antennas;
    obtaining a direct measurement of travel time of said energy from the output of one of said receiving antennas; and determining the mudcake-corrected water-filled porosity and/or the mudcake thickness of said formations from said differential and said direct measurements.

14. The method as defined by claim 13, wherein said direct measurement is obtained from the output of said far receiver.

15. The method as defined by claim 14, wherein said step of obtaining said differential measurement includes measuring the phase difference between the electromagnetic energy received at said near and far receivers, and said step of obtaining said direct measurement includes measuring the phase difference between a reference derived from the transmitted electromagnetic energy and the electromagnetic energy received at said far receiver.

16. For use in conjunction with an apparatus for investigating subsurface formations surrounding a borehole, said apparatus including a source of microwave electromagnetic energy; a logging device suspendable in the borehole; a transmitting antenna mounted on said device for transmitting said microwave electromagnetic energy into said formations; and near and far spaced receiving antennas mounted on said device for receiving microwave electromagnetic energy from said formations; a method for determining the mudcake-corrected water-filled porosity and/or the mudcake thickness of said formations, comprising the steps of:

deriving a differential measurement of travel time of said energy from the outputs of said receiving antennas;

deriving a direct measurement of travel time of said energy from the output of one of said receiving antennas; and determining the mudcake-corrected water-filled porosity and/or the mudcake thickness of said formations from said differential and said direct measurements.

17. The method as defined by claim 16, wherein said direct measurement is derived from the output of said far receiver.

18. The method as defined by claim 16, wherein said differential measurement is derived from measurement of the phase difference between the electromagnetic energy received at said near and far receivers, and said direct measurement is derived from measurement of the phase difference between a reference derived from the transmitted electromagnetic energy and the electromagnetic energy received at said far receiver.

* * * * *